(12) United States Patent
Park (10) Patent No.: US 9,495,091 B2
(45) Date of Patent: Nov. 15, 2016

(54) METHOD AND APPARATUS FOR DISPLAYING TEXT INFORMATION IN MOBILE TERMINAL

(75) Inventor: Sunyoung Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 669 days.

(21) Appl. No.: 13/081,614

(22) Filed: Apr. 7, 2011

(65) Prior Publication Data

US 2011/0263298 A1    Oct. 27, 2011

(30) Foreign Application Priority Data

Apr. 22, 2010  (KR) ........................ 10-2010-0037510

(51) Int. Cl.
| | | |
|---|---|---|
| G06F 3/048 | (2013.01) | |
| G06F 3/0488 | (2013.01) | |
| G06F 3/0482 | (2013.01) | |

(52) U.S. Cl.
CPC .......... G06F 3/0488 (2013.01); G06F 3/0482 (2013.01)

(58) Field of Classification Search
CPC combination set(s) only.
See application file for complete search history.

(56) References Cited

U.S. PATENT DOCUMENTS

| | | | |
|---|---|---|---|
| 6,067,070 A | 5/2000 | Suzuki et al. ................. 345/127 |
| 7,496,385 B2 | 2/2009 | Gruen et al. .................. 455/566 |
| 2002/0075309 A1 | 6/2002 | Michelman et al. | |
| 2004/0015547 A1 | 1/2004 | Griffin et al. | |
| 2004/0064791 A1 | 4/2004 | Hattori et al. | |
| 2005/0223057 A1* | 10/2005 | Buchheit et al. ............. 709/203 |
| 2005/0223326 A1 | 10/2005 | Chang et al. | |
| 2005/0234850 A1 | 10/2005 | Buchheit et al. | |
| 2008/0094371 A1* | 4/2008 | Forstall et al. ................ 345/173 |
| 2008/0165136 A1* | 7/2008 | Christie et al. ............... 345/173 |
| 2008/0250354 A1* | 10/2008 | Park ...................... G06F 3/0482 715/845 |
| 2009/0157513 A1 | 6/2009 | Bonev et al. | |
| 2009/0259975 A1* | 10/2009 | Asai .............................. 715/850 |
| 2009/0282332 A1 | 11/2009 | Porat | |
| 2009/0307188 A1 | 12/2009 | Oldham et al. | |
| 2011/0163970 A1* | 7/2011 | Lemay ................ G06F 3/04883 345/173 |

FOREIGN PATENT DOCUMENTS

| | | | |
|---|---|---|---|
| CN | 101356528 A | 1/2009 | |
| CN | 101997964 A | 3/2011 | |
| EP | 2 109 032 A2 | 10/2009 | |
| JP | 2004-118550 A | 4/2004 | |
| JP | 2005-128744 | 5/2005 | ............... G06F 3/00 |
| JP | 2007-531165 A | 11/2007 | |
| KR | 10-0655585 B1 | 12/2006 | |
| KR | 10-2007-0000506 A | 1/2007 | |
| KR | 10-2008-0068921 A | 7/2008 | |
| WO | 2004-008336 A1 | 1/2004 | |
| WO | 2007/059503 A1 | 5/2007 | |
| WO | 2008/030975 A1 | 3/2008 | |

OTHER PUBLICATIONS

European Search Report dated Mar. 9, 2016.

* cited by examiner

*Primary Examiner* — Hien Duong
(74) *Attorney, Agent, or Firm* — Cha & Reiter, LLC (57) ABSTRACT

A method and apparatus for displaying text information in the form of a list is provided. A method for displaying text information according to the present invention includes displaying a list of at least one item representing text information and a partial content of the text information; and modifying, in response to a predetermined key input, the list to show whole content of the text information corresponding to the selected one item.

19 Claims, 8 Drawing Sheets

METHOD AND APPARATUS FOR DISPLAYING TEXT INFORMATION IN MOBILE TERMINAL

CLAIM OF PRIORITY

This application makes reference to and claims all benefits accruing under 35 U.S.C. Section 119 from an application entitled "METHOD AND APPARATUS FOR DISPLAYING TEXT INFORMATION IN MOBILE TERMINAL" filed in the Korean Intellectual Property Office on Apr. 22, 2010 and there duly assigned Serial No. 10-2010-0037510.

BACKGROUND OF THE INVENTION

1. Field of the Invention

The present invention relates to a mobile terminal and, in particular, to a method and apparatus for displaying text information in the form of a list in a mobile terminal.

2. Description of the Related Art

With the widespread use of mobile telephony, a mobile phone has evolved into a mobile multimedia communication terminal supporting various supplementary services including data transmission as well as convention voice call service. A common function of the mobile terminal is a memo function which enables the user to save text information to serve as a reminder. If the user makes a request, the mobile terminal provides the user with the saved text information in the form of a list of text information items indicated by title or partial string of text information. When one of the text information items is selected from the list, the text information corresponding to the selected item is displayed for a user's review.

However, the above-mentioned memo function has drawbacks in that the user must change the text information item list screen to a content view screen in order to check the content of the selected text information. That is, a user is unable to check the content of the selected text information item from the text information item list screen. Further, a user can only check the content of the only one text information item at a time.

SUMMARY OF THE INVENTION

In order to solve the problems of the prior art, the present invention provides a method and apparatus for displaying text information in a mobile terminal that allows the user to check the content of the text information items on the text information list screen without switching the screen.

Also, the present invention provides a method and apparatus for displaying text information in a mobile terminal by presenting the contents of a plurality of text information items on a single screen.

In accordance with an aspect of the present invention, a method for displaying text information includes displaying a list of at least one item representing text information and showing partial content of the text information; and modifying, in response to a predetermined key input, the list to show the at least one item with whole content of the text information.

In accordance with another aspect of the present invention, a text information display method includes displaying a list of a plurality of items of text information; selecting at least one of the items according to a user input; and deleting, when an predetermined key is input, the at least one selected item.

In accordance with still another aspect of the present invention, a mobile terminal includes an input unit which receives a user command; a display unit which displays execution screen; and a control unit which detects a command input through the input unit, controls the display unit to display a list of at least one item of text information in response to the command, the item showing partial content of the text information, and modifies, when a predetermined key is input through the input unit, the at least one item to show whole contents of the text information.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

In the following description, the term "text information" represents the content composed of a text or a string of text such as a memo, an incoming text message, and an outgoing text message; and the term "text information list" represents the list composed of at least one text information item such as memo list, incoming message list, and outgoing message list. Also, the term "text information item" represents a graphical object constituting the text information list and representing the individual text information. In the embodiments of the present invention, the text information item can be presented with a partial or an entire text string of the text information.

For the purposes of clarity and simplicity, detailed description of well-known functions and structures incorporated herein may be omitted to avoid obscuring the subject matter of the present invention.

Although the description is directed to a mobile terminal, the teachings of the present invention is not limited thereto but can be applied to any of the devices equipped with a touchscreen. The mobile terminal according to an embodiment of the present invention can be any of information communication devices and multimedia devices equipped with a touchscreen including a Portable Multimedia Player (PMP), a Personal Digital Assistant (PDA), a Smartphone, an MP3 player, etc.

Figure 1:
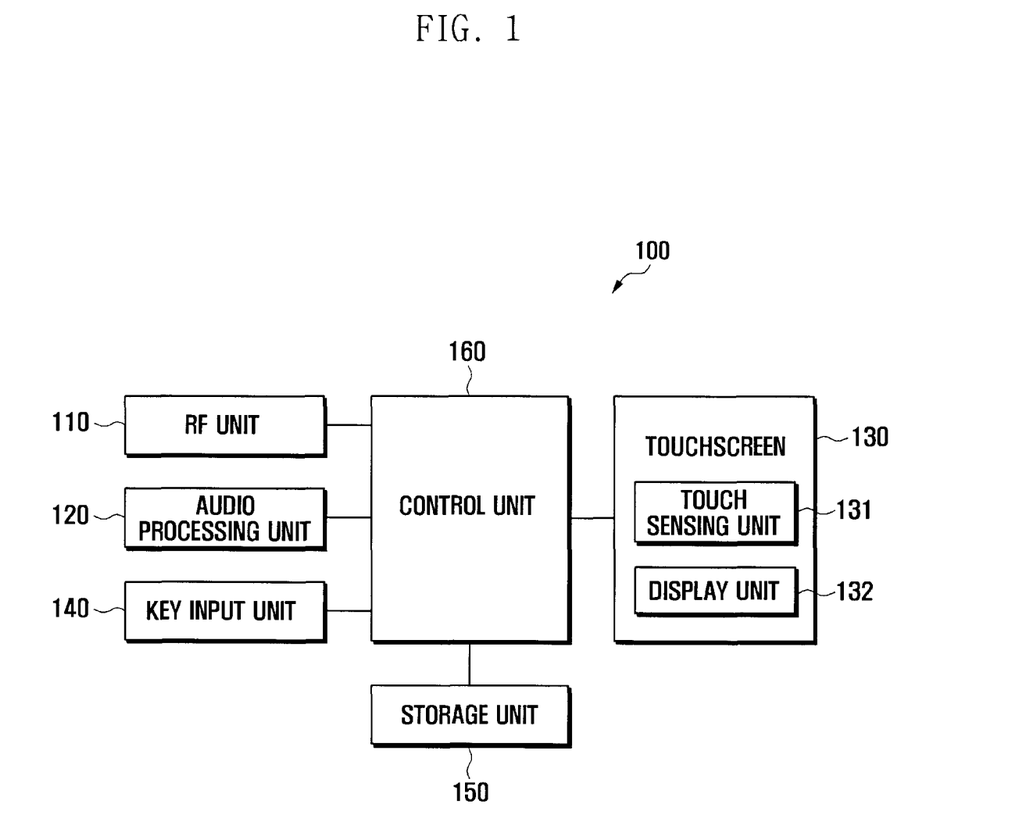
FIG. 1 is a block diagram illustrating a configuration of a mobile terminal according to an embodiment of the present invention.

FIG. 1 is a block diagram illustrating a configuration of a mobile terminal according to an embodiment of the present invention. As shown in FIG. 1, the mobile terminal according to the embodiment of the present invention includes a Radio Frequency (RF) unit 110, an audio processing unit 120, a touchscreen 130, a key input unit 140, a storage unit 150, and a control unit 160.

The RF unit 110 is responsible for transmitting/receiving radio signals carrying data. The RF unit 110 can include an RF transmitter for up-converting and amplifying a transmission signal and an RF receiver for low noise amplifying and down-converting a received signal. The RF unit 110 delivers the data received over a radio channel to the control unit 160 and also transmits the data output by the control unit 160 over the radio channel.

The audio processing unit 120 can include a codec pack, which can include a data codec for processing packet data and an audio codec for processing audio signal including voice. The audio processing unit 120 converts a digital audio signal into an analog audio signal to be output through a speaker (SPK) by means of the audio codec and converts the analog audio signal input through a microphone (MIC) to a digital audio signal.

The touchscreen 130 includes a touch sensing unit 131 and a display unit 132. The touch sensing unit 131 senses a touch input by the user. The touch sensing unit 131 can be implemented with a touch sensor (such as a capacitive overlay, a resistive overlay, and an infrared beam) and/or a pressure sensor. It should be noted that the touch sensing unit 131 can be further implemented with other various types of sensing devices capable of detecting contact or pressure by an object.

In operation, the touch sensing unit 131 senses the touch input by the user and sends a touch signal corresponding to the touch to the control unit 160. The touch signal includes coordinates of a point at which the touch is detected. In case that the touch point moves, the touch sensing unit 131 sends the touch signal including the coordinates on the path of the movement to the control unit 160. The movement can be categorized into one of a flick in which the touch point moves faster than a threshold speed and a drag in which the touch point moves slower that the threshold speed.

The display unit 132 can be implemented with one of a Liquid Crystal Display (LCD), an Organic Light Emitting Diodes (OLED), and an Active Matrix OLED (AMOLED) for displaying the menus, input data, function setting information, and other information in the form of a visual image. The display unit 132 is responsible for displaying a booting screen, a standby mode screen, a menu screen, a call progressing screen, and other application execution screens.

The key input unit 140 detects a key entry and sends the key signal corresponding to the key entry to the control unit 160. The key input unit 140 can be implemented with a keypad having alphanumeric and navigation keys along with other function keys on one side of the mobile terminal 100. Alternatively, the mobile terminal 100 can be configured so as to be manipulated only with the touchscreen 130, omitting the key input unit 140.

The storage unit 150 stores programs and data necessary for operating the mobile terminal and can be divided into a program region and a data region. The program region stores Operating System (OS) for booting the mobile terminal 100, application programs necessary for playing multimedia contents, and others necessary for supporting supplementary functions such as camera function, sound playback function, still and motion picture playback function. The data region stores the data generated as a result of the operation of the mobile terminal 100 such as still and motion pictures, phonebooks, and audio files.

The control unit 160 controls the operations of internal function blocks of the mobile terminal 100. According to a first embodiment of the present invention, the control unit 160 monitors to detect a text information list display command. If the text information list display command is detected, the controller unit 160 controls such that the text information list having at least one text information item with a partial content of the text information is displayed along with an expansion key. The control unit 160 monitors to detect an input made on the expansion key in the text information list screen and, if an input is made on the expansion key, controls such that the at least one text information item is expanded in a direction perpendicular to the direction of the text string, switching the expansion key for a shrink key.

According to a second embodiment of the present invention, the control unit 160 monitors to detect a text information list display command. If the text information list display command is detected, the controller 160 controls such that the text information list having at least one text information item with the whole content of the text information is displayed, being ordered in a direction, along with individual shrink keys. The control unit 160 monitors to detect an input made on the shrink of a specific text information item and, if an input is made on the shrink key, controls such that the text information item shrinks in a direction perpendicular to the direction of the text sting, showing the partial content of the text information and switching the shrink key for an expansion key. The control unit 160 continues monitoring to detect an input for selecting the expansion key and, if an input for selecting the expansion key is detected, controls such that the text information item is expanded to show the whole content of the text information again, switching the individual expansion key for the individual shrink key.

According to a third embodiment of the present invention, the control unit 160 monitors to detect a text information list display command. If the text information list display commend is detected, the controller unit 160 controls such that the text information list having a plurality of text information items, each having a deletion key, is displayed. The control unit 160 continues monitoring to detect an input for selecting the deletion key of a specific text information item and, if an input is made for selecting the deletion key, controls such that the corresponding text information item is deleted from the text information list. If a key for deleting plural text information items is detected, the control unit 160 controls such that the individual delete keys are switched for selection keys and, if at least one text information item is selected, controls to show the selection of the at least one text information item. Sequentially, the control unit controls the touch sensing unit 131 to detect the selection of plural deletion keys and, if the plural deletion keys are selected, controls such that the at least one text information item selected is deleted from the list.

Figure 2:
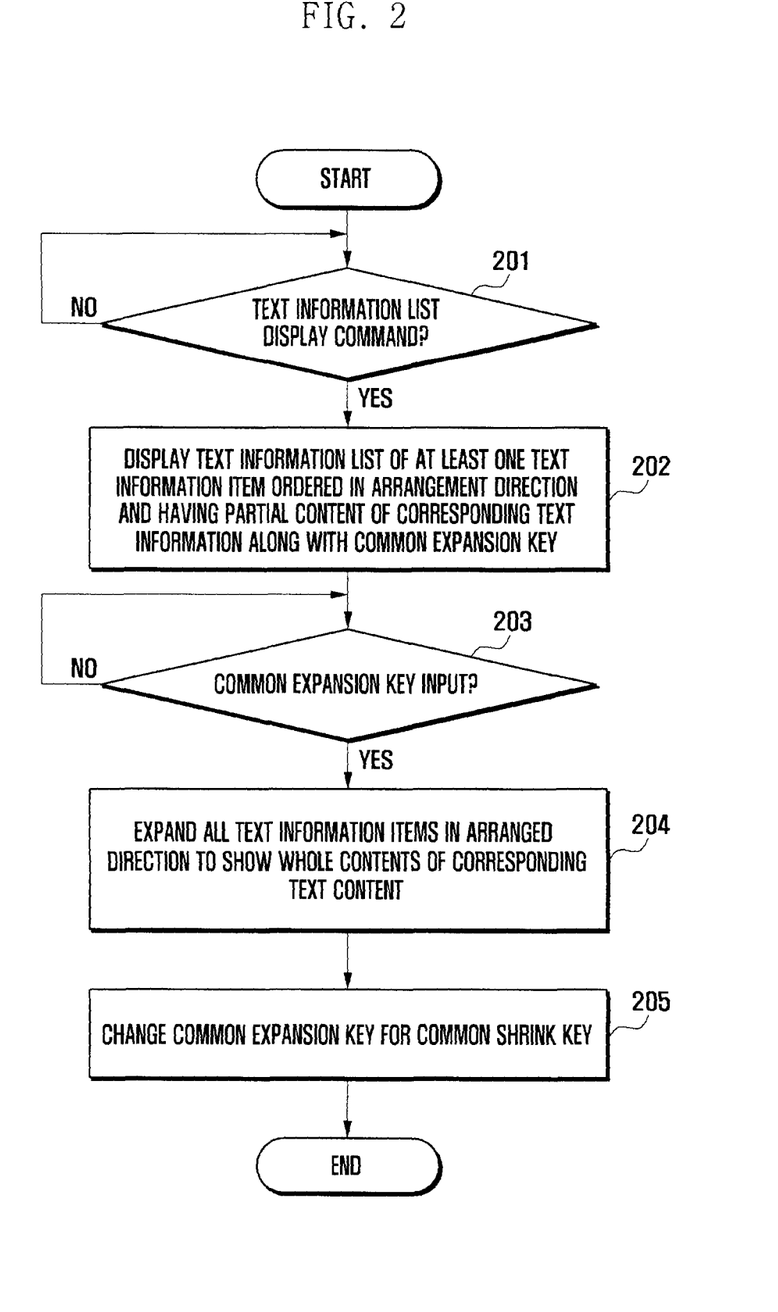
FIG. 2 is a flowchart illustrating a method for displaying text information in a mobile terminal according to a first embodiment of the present invention.

FIG. 2 is a flowchart illustrating a method for displaying text information in a mobile terminal according to the first embodiment of the present invention where windows of the text information items contained in the text information list is changed for a display.

The control unit 160 monitors to detect a command input and, if a command is detected, determines whether the command is a text information list display command (201). In the embodiment, the control unit 160 controls the touchscreen 130 and the key input unit 140 to detect the user command such as a memo list display command, an incoming text message list display command, and an outgoing text message list display command.

If it is determined that the text information list display command is input, the control unit 160 controls such that at least one text information item with its partial or whole content is displayed, by means of the display unit 132, in the form of a list along with an expansion key, being ordered in a direction (202). In the embodiment, the text information item can be presented in the form of a horizontal bar having a single line text string at step 202. The single line text string can be a part of the whole text information. The text information item can be presented in the form of a horizontal bar having a two- or three-line text string at step 202. At step 202, the text information item can be presented with a symbol indicating that the last part of the content is omitted. The omission symbol can be '. . .' or '→'. With the omission symbol, the user can recognize that the text information item shows a partial content of the text information.

In case that the text information is a memo, the text information item representing the memo may be presented along with the written date or time. In case that the text information is an incoming text message, the text information item representing the incoming text message may be presented along with the received date or time. In case that the text information is an outgoing text message, the text information item representing the outgoing text message may be presented along with the sent date or time.

In the embodiment, the text information items are ordered in a predetermined order. The text information items can be arranged in an order of the written dates for the memo list, the received dates for the incoming message list, and the sent dates for the outgoing message list.

In the embodiment, the text information items can be ordered from the top to the bottom or from the left to the right of the screen. In case that the text item is shaped in the form of a rectangular bar, the text information list is composed of a plurality of the text items ordered from the top to the bottom or from the left to the right. In the first embodiment of the present invention, the description is directed to the case where the text items are ordered from the top to the bottom of the screen for illustrative purposes.

In the embodiment, the text information list can be provided with an expansion key. The expansion key can be presented in the form of an icon positioned at one of the left, right, top, and bottom sides of the screen. Preferably, the expansion key is presented with an indicative text such as "Maximize" for indicating the use of all "expansion" key. The expansion key can be placed in a region other than the region where the text information items are listed or can overlapped on the text information items. In case that the text information is a memo, the text information list can be provided with a 'new memo key' for writing new memo. Alternatively, the text information list screen can be configured such that the expansion key is hidden when the text information list is initially displayed and appears on the text information list in response to a predetermined key input.

Figure 3:
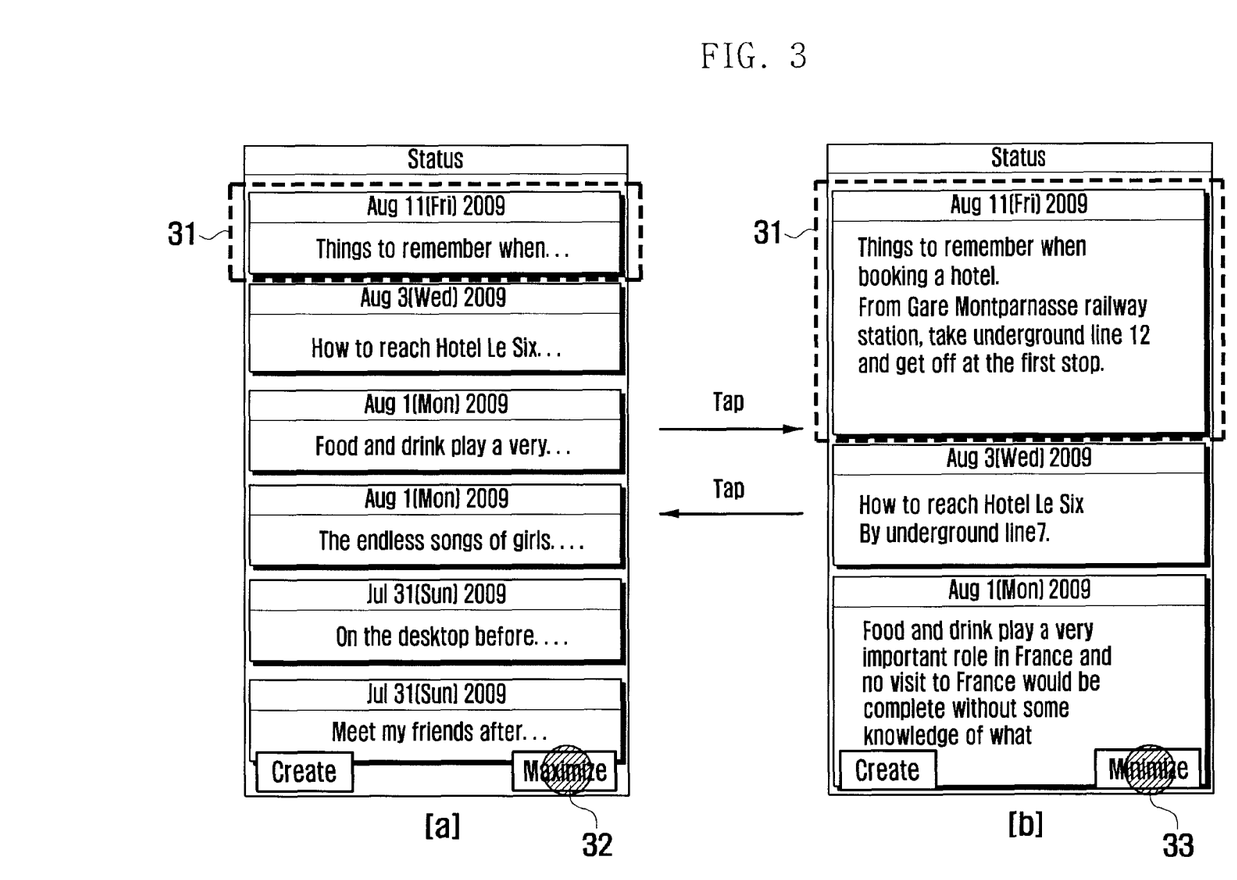
FIG. 3 is a diagram illustrating a text information list presentation process of the text information display method according to the first embodiment of the present invention.

FIG. 3 is a diagram illustrating a text information list presentation process of the text information display method according to the first embodiment of the present invention.

Part [a] of FIG. 3 shows a memo list as an exemplary text information list. The text information list includes six text information items 31 ordered from the top to the bottom of the screen by mostly recently written text. The text information item 31 is shaped in the form a rectangular bar having the written date of the memo and a partial content of the memo. The partial content of the memo is presented with an omission symbol for indicating that there is a part of the memo not presented. For example, the text information item 31 has the written date 'Aug. 11 (Fri) 2009' and the partial content of the memo 'Things to remember when' followed by the omission symbol ' . . . '.

As shown, the text information item 31 is composed of a single line text string partially extracted from the original text information. The most recently dated text information item shows the single line text string composed of four words of 'Things,' 'to,' 'remember;' and 'when'; and the second recently dated text information item shows the single line text string composed of six words of 'How,' 'to,' 'reach,' Hotel,' 'Le,' and 'six.'

At the bottom right corner of the text information list screen, a common expansion key 32 labeled 'Maximize' is presented. As shown in part [a] of FIG. 3, the common expansion key 32 is overlapped with a part of the last text information item. The text information list screen also provides a new memo key labeled 'Create' at the bottom left corner.

The control unit 160 controls the touch sensing unit 131 to detect a touch made on the common expansion key presented on the text information list screen (203). Here, the control unit 160 can determine whether the touch is a tap in which a contact is made and released quickly on the screen.

If it is determined that a tap is made to the common expansion key, the control unit 160 controls such that each of the text information items is expanded to show the whole content of the corresponding text information by means of the display unit 132 (204). At step 204, the control unit 160 configures each of the text information items to have the whole content of the original text information and controls such that text information items having the respective whole contents are displayed in the form of a list by means of the display unit 132.

The control unit 160 can control such that each of the text information items is expanded to a size fit for the presentation of the whole content. In case that the text information items are ordered from the top to the bottom of the screen, the control unit 160 controls such that the text information items are expanded downward. When the text information items are expanded, the order of the items is not changed, and each text information item is pushed down as much as the previous text information item is expanded. For example, if the first text information item is expanded downward, the second text information item moves download as much as the expansion of the first text information item. Similarly, the third text information item moves download as much as the sum of the expansions of the first and second text information items.

The text information items are displayed in a text information item display region and, when the text information items are expanded, the number of text information items viewable in the text information display region can decrease. That is, if each text information item changes in size, some of the low order items are pushed down to disappear out of the screen. The user can scroll up the list to navigate the low ordered text information items with flick or drag gesture.

The control unit 160 controls such that the text information items are presented with their whole contents, and the common expansion key is switched for the common shrink key. Here, the common key can be changed in label from a word indicating 'expansion' to a word indicating 'shrink' without change of its position.

Part [b] of FIG. 3 shows the text information list having the text information items expanded in response to the tap gesture to the expansion key labeled 'Maximize.' In part [b] of FIG. 3, the text information items 31 are presented with their whole contents without omission symbols. For example, the highest order text information item 31 is presented with its whole content "Things to remember when booking a hotel. From Gare Montparnasse railway station, take underground line 12 and get off at the first stop." corresponding to the partial content "Things to remember when . . . ". In order to show the whole content, the highest order text information item expands in size such that the second highest order text information item moves as much as the expansion of the highest order text information item.

Also, the second highest order text information item is presented with its whole content "How to reach Hotel Le Six By underground line 7." Corresponding to the partial content "How to reach Hotel Le Six . . . ". In order to shown the whole content, the second highest order text information item expands in size such that the third highest order text information item moves as much as the expansions of the first and second highest order text information items.

Part [b] of FIG. 3 shows the highest and second highest text information items with their whole contents but the third highest text information item with its partial content. This is because that the third highest text information item expands across the text information item display region. For the same reason, the fourth to sixth text information items that are shown in part [a] of FIG. 3 disappear in part [b] of FIG. 3. To this end, the user can navigate the text information items disappeared partially and wholly in the expanded mode with a touch and flick or drag gesture on the screen. The common expansion key 32 labeled 'Maximize' for expansion in part [a] of FIG. 3 is changed for the common shrink key 33 labeled 'Minimize' for shrink in part [b] of FIG. 3.

If the user makes a touch to the common shrink key 33, the control unit 160 controls such that the text information items shrink in the direction opposite to the expansion direction so as to appear with their partial contents. In the exemplary case of FIG. 3, if the tap gesture is made to the 'Minimize' button in part [b] of FIG. 3, the expanded text information items shrink as shown in part [a] of FIG. 3; and if the tap gesture is made to the 'Maximize' button in part [a] of FIG. 3, the shrunk text information items expand as shown in part [b] of FIG. 3.

In the first embodiment of the present invention, the user can make a key input such that the text information items presented with their partial contents expands with their whole contents. In this manner, the user can conveniently check the whole content of each text information item on the text information list screen.

Figure 4:
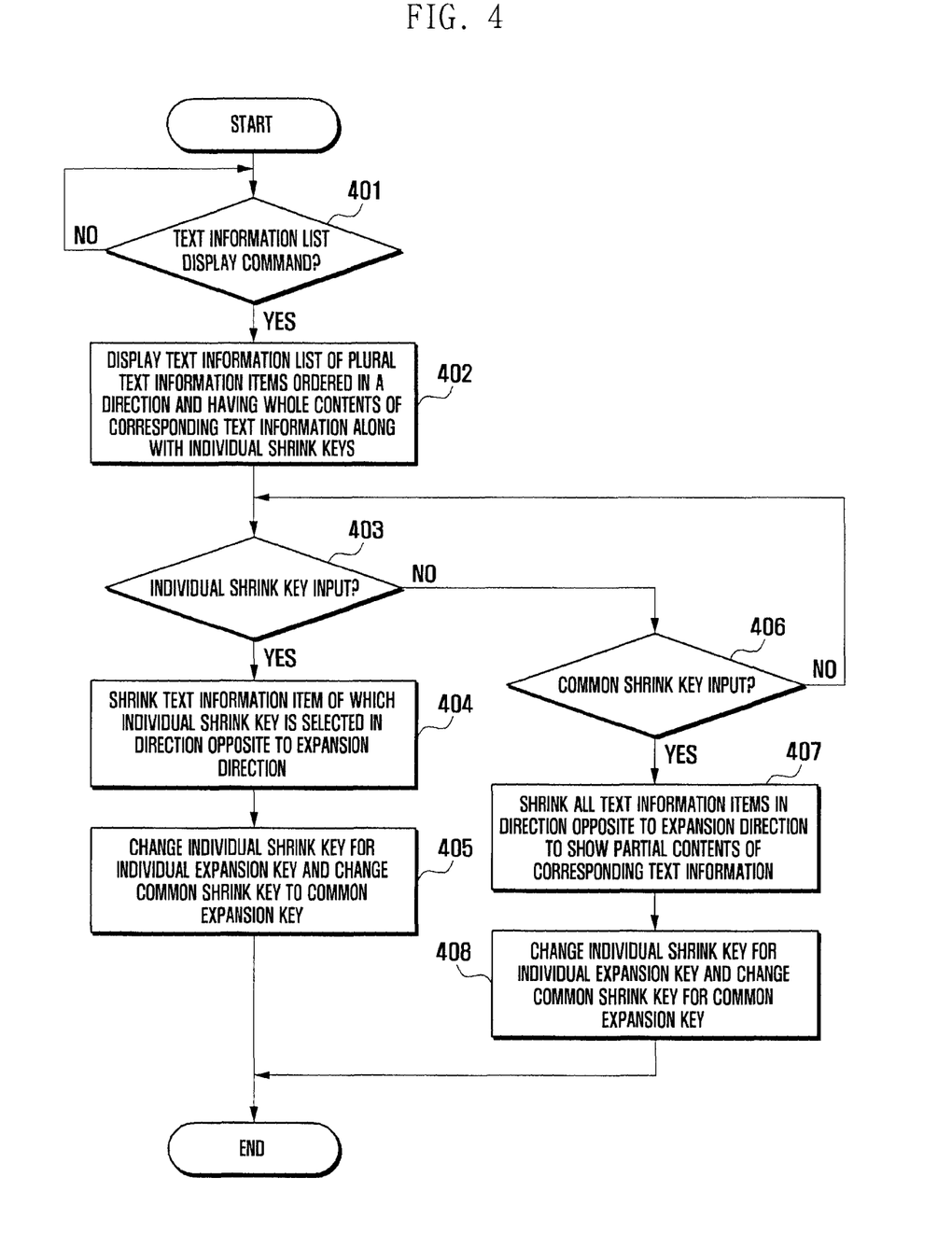
FIG. 4 is a flowchart illustrating a method for displaying text information in a mobile terminal according to a second embodiment of the present invention.

FIG. 4 is a flowchart illustrating a method for displaying text information in a mobile terminal according to the second embodiment of the present invention where the text information items contained in the text information list can be changed in shape entirely or individually.

The control unit 160 monitors to detect a command input and, if a command is detected, determines whether the command is a text information list display command (401). In the second embodiment, similar to the first embodiment, the controls unit 160 controls the touchscreen 130 and the key input unit 140 to detect the user command such as a memo list display command, an incoming text message list display command, and an outgoing text message list display command. In the state where the text information items having their partial contents with respective individual expansion keys are requested for display in the form of the text information list having a common expansion key, the control unit 160 can determine, by means of the touch sensor 131, whether a tap gesture is made to the command expansion key at step 401.

If it is determined that the command is the text information list display command, the control unit 160 controls such that a plurality of text information items with corresponding entire contents along with respective individual shrink keys are displayed by means of the display unit 132. In the second embodiment of the present invention, the text information items can be requested by the created or modified date/time in a direction (402). In the second embodiment of the present invention, the direction can be the horizontal direction from left to right or the vertical from top to bottom of the screen, and each text information item can be presented with the modified date or time information.

In the second embodiment of the present invention, each text information item is provided with an individual shrink key. The individual shrink key can be provided in the shape of 'Δ' to indicate that the text information item is in the expanded state.

Further, in the second embodiment of the present invention, the text information list can be provided with a common shrink key. The common shrink key can be presented in the form of an icon at a specific area on the screen. The common shrink key can be labeled 'Minimize' to indicate the meaning of 'shrink'. Moreover, the text information list can have a new text information creation key for supporting creation of new text information.

Figure 5:
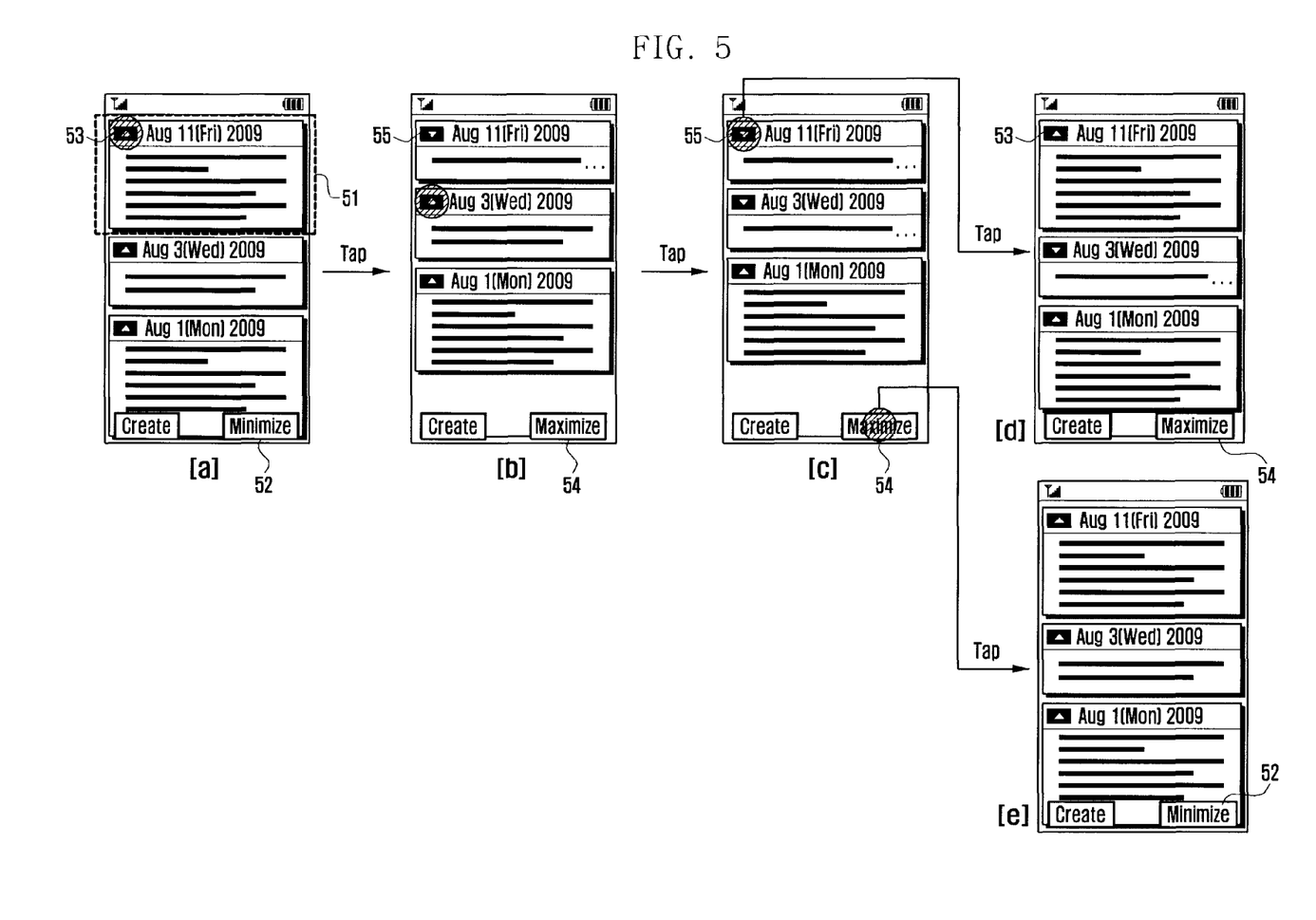
FIG. 5 is a diagram illustrating a text information list presentation process of the text information display method according to the second embodiment of the present invention.

FIG. 5 is a diagram illustrating a text information list presentation process of the text information display method according to the second embodiment of the present invention.

Part [a] of FIG. 5 shows a screen displaying a text information list composed of three text information items 51 ordered from the top to the bottom. The text information items 51 can be ordered by creation date/time from the top to the bottom. Each text information item is shaped in the form of a rectangular bar having the creation date and partial content of the corresponding text information. Each text information item 51 includes an individual shrink key 53 at the left of the creation date.

The text information list has a shrink key 52 labeled 'Minimize' at the bottom right corner of the screen. The text information list also has a new text information creation key labeled 'Create' at the bottom left corner of the screen.

In the state where the text information list displayed, the control unit 160 monitors by means of the touch sensing unit 131 to detect an input and, if detected, determines whether the input is made to the individual shrink key of one of the text information items (403). If the input is made to the individual shrink key of a text information item, the control unit 160 controls such that the text information item is shrunk in size so as to show the partial content of the corresponding text information (404). The text information item shrinks in size as much as the amount of the disappeared part of the text information. In case that the text information items are ordered from the top to the bottom, the control unit 160 controls such that the text information item of which individual shrink key is selected shrinks in upward direction. When the text information item shrinks, the other text items below the shrunk text information item moves upward as much as the shrink with change of their orders. For example, if the second highest order text information shrinks, the third highest order text information moves upward as much as the shrink of the second highest order text information.

The text information items are presented in the text information item display region and, when the text information items shrink, the number of text information items viewable in the text information item display region can increase. That is, if one of the text information items shrinks, the text information items below the shrunk text information item moves upward such that some of the text information items out of the range of the text information display region appear.

The control unit 160 controls such that the text information item of which individual shrink key has been selected is presented with partial content of the corresponding text information, while changing the individual shrink key to the individual expansion key and the common shrink to the common expansion key (405).

Part [b] of FIG. 5 shows the text information list presented when a tap gesture made to the individual shrink key 53 of the highest order text information item 51. As shown in part [b] of FIG. 5, the highest order text information item shrinks in response to the tap gesture made to the individual shrink key 53 such that the second and third highest order text information items move upward as much as the shrink of the highest order text information item. At this time, the individual shrink key shaped in the form of 'Δ' is changed to the individual expansion key shaped in the form of '∇', and the common shrink key labeled 'Minimize' is changed to the common expansion key labeled 'Maximize.'

Part [c] of FIG. 5 shows the text information list presented when a tap gesture made to the individual shrink key of the second highest order text information item in the screen image of part [b] of FIG. 5. As shown in part [c] of FIG. 5, the second highest order text information item shrinks to have a single link of text such that the third highest order text information item moves upward as much as the shrink of the second highest order text information item. At this time, the individual shrink key shaped in the form of 'Δ' is changed to the individual expansion key shaped in the form of '∇', and the common expansion key 54 is maintained as labeled 'Maximize.'

According to an embodiment of the present invention, in the state where the text information list has some of the text information items having the respective individual expansion keys in the shrunk mode and the other text information items having the respective individual shrink keys in expanded mode and the common expansion key, the control unit 160 can monitor by means of the touch sensing unit 131 to detect whether a touch is made to the individual expansion key of one of the text information items in the shrunk mode. If it is detected that a touch is made to the individual expansion key of one of the text information items, the control unit 160 controls such that the corresponding text information item is expanded to show the whole content of the corresponding text information. Here, the individual expansion key can be changed to the individual shrink key.

Part [d] of FIG. 5 shows the text information list presented when a tap gesture is made to the individual expansion key 55 of the highest order text information item 51 in the screen image of part [c] of FIG. 5. As shown in part [d] of FIG. 5, the highest order text information item is expanded to show the whole content of the corresponding text information such that the second and third highest order text information items are moved download as much as the expansion of the highest order text information item. Here, the individual expansion key '∇' 55 is changed to the individual shrink key 'Δ' 53, and the common expansion key 54 is maintained as labeled 'Maximize'.

In the state where the text information list has some of the text information items having the respective individual expansion keys in the shrunk mode and the other text information items having the respective individual shrink keys in expanded mode and the common expansion key, the control unit 160 can monitor by means of the touch sensing unit 131 to detect whether a touch is made to the common expansion key. If it is detected that a touch is made to the common expansion key, the control unit 160 controls such that all the text information items are expanded in a direction to show their whole contents. Here, the individual expansion keys are changed to the individual shrink keys, and the common expansion key is changed to the common shrink key.

Part [e] of FIG. 5 shows the text information list presented when a tap gesture is made to the common expansion key 54 of the text information list in the screen image of part [d] of FIG. 5. As shown in part [e] of FIG. 5, the first third highest order items are all expanded such that the first and second highest order text information items are presented with their whole content while the third highest order text information item is presented with its partial content. Here, the individual expansion keys '∇' are changed to the individual shrink keys 'Δ' and the common expansion key labeled 'Maximize' is changed to the common shrink key labeled 'Minimize.'

If the input is not made to the individual shrink key of one of the text information items at step 403, the control unit 160 determines whether the input is made to the common shrink key (406). It the input is made to the common shrink key, the control unit 160 controls such that all the text information items shrink to show their partial contents, respectively. In case that the text information items are ordered from the top to the bottom, the control unit 160 controls such that the text information items shrink upward. The text information items are presented in the text information item display region and, when the text information items shrink, the number of text information items viewable in the text information item display region can increase. This means that the text information items pushed downward out of the text information item display region reappear. Next, the control unit 160 controls to change the individual shrink keys to the individual expansion keys and the common shrink key to the common expansion key.

In the second embodiment of the present invention, the user can expand or shrink the individual text information items selectively or all the text information items at a time. The text information list can show text information items in different importance by presenting each of the text information item in shrunk or expanded mode.

In the first embodiment of the present invention, the description is directed to the case where the text information list is displayed such that all the text information items are presented with their partial contents along with a common expansion key in response to the text information list display command. However, the present invention is not limited thereto, and all the text information items can be presented with their whole contents and a common shrink key, in response to the text information list display command, as in the second embodiment. Further, the present invention is not limited thereto, thus all the text information items be presented with their partial contents and a common expansion key, in response to the text information list display command.

In case that a text information list end command is input while the text information list is displayed on the screen, the control unit 160 saves the display state of the text information list such that, when the text information list is called afterward, the text information list is presented in the saved display state. For example, if the text information list end command is input in the state where the text information list has the first and second highest order text information items in shrunk mode and the third highest order text information item in expanded mode along with the common expansion key labeled 'Maximize' as shown in part [c] of FIG. 5, the control unit 160 saves the text information list state of part [c] of FIG. 5 such that, when the text information list display command is input afterward, the text information list is presented in the saved state.

Figure 6:
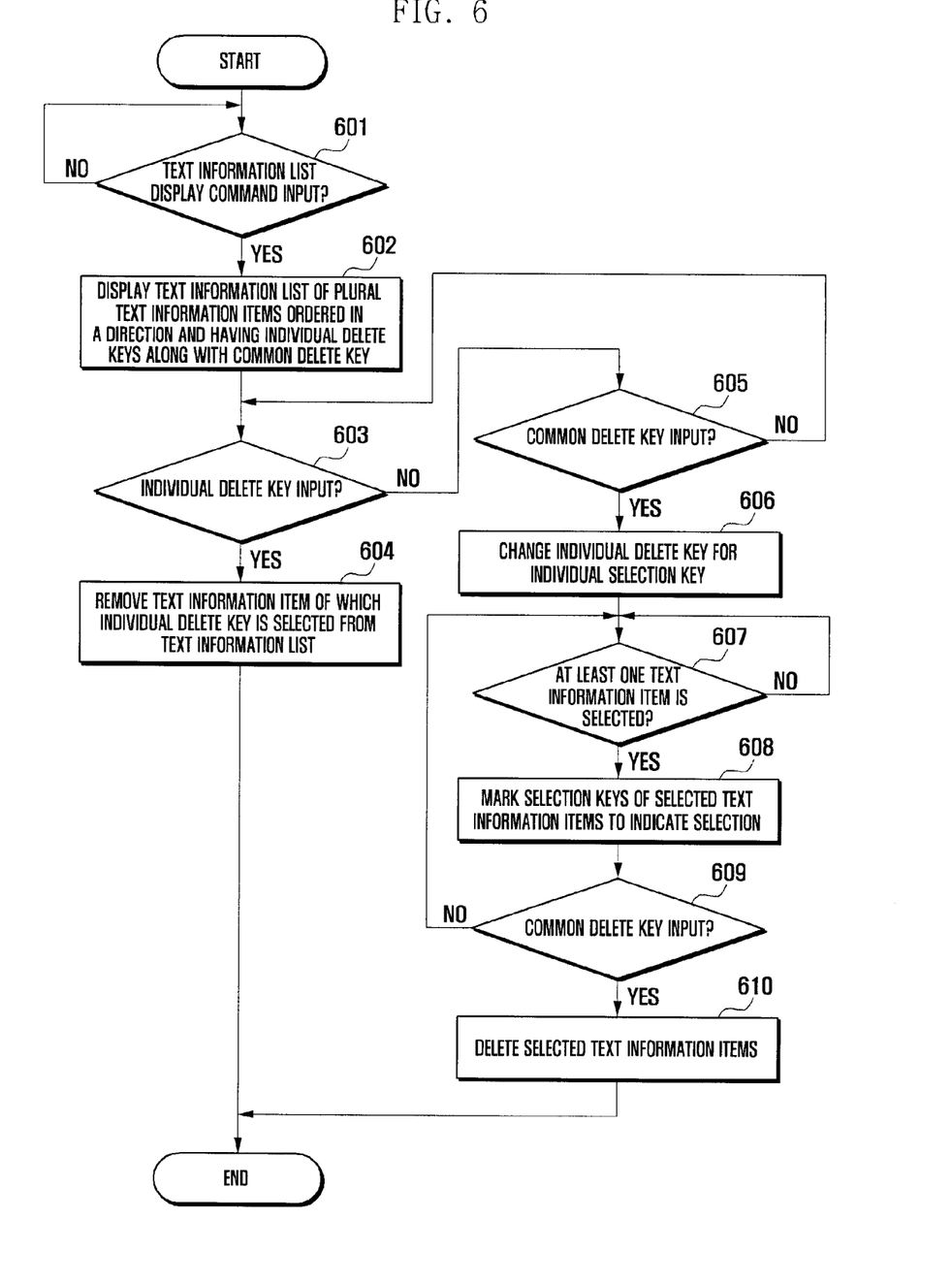
FIG. 6 is a flowchart illustrating a method for displaying text information in a mobile terminal according to a third embodiment of the present invention.

FIG. 6 is a flowchart illustrating a method for displaying text information in a mobile terminal according to the embodiment of the present invention, where a Graphic User Interface (GUI) for deleting text information items is displayed from the text information list.

The control unit 160 monitors to detect a command input and, if a command is detected, determines whether the command is a text information list display command (601). In the embodiment, the controls unit 160 controls the touchscreen 130 and the key input unit 140 to detect the user command such as a memo list display command, an incoming text message list display command, and an outgoing text message list display command.

If it is determined that the command is the text information list display command, the control unit 160 controls such that the text information list composed of a plurality of text information items having respective individual delete keys along with a common delete key (602) are displayed. According to an embodiment of the present invention, the text information items are presented with partial or whole contents of the corresponding text information. In the third embodiment of the present invention, the text information items are ordered by creation date or time in a predetermined direction. The predetermined direction can be the direction from the top to the bottom or from the left to the light of the screen. Further, each text information item can be presented with the created or modified date or time information. Moreover, the text information list screen can be configured such that the common deletion key is hidden when the text information list is initially presented and appears on the text information list in response to a predetermined key input.

In the third embodiment of the present invention, each text information item has the individual delete key. The individual delete key is provided for supporting deletion of the corresponding text information item from the text information list. The individual delete key can be represented by 'X' for indicating the meaning of deletion. Further, the text information list is provided with the common delete key. The common delete key is the key for supporting deletion of more than one text information item at a time. The common delete key is labeled 'Delete' for indicating its removal function.

In case that each text information item is presented with the partial content, i.e., partial text string, of the corresponding text information, the text information list can be provided with a common expansion key; in other case where each text information item is presented with the whole content of the corresponding text information, the text information list can be provided with a common shrink key. The text information list can further include a text information creation key for creating new text information.

Figure 7:
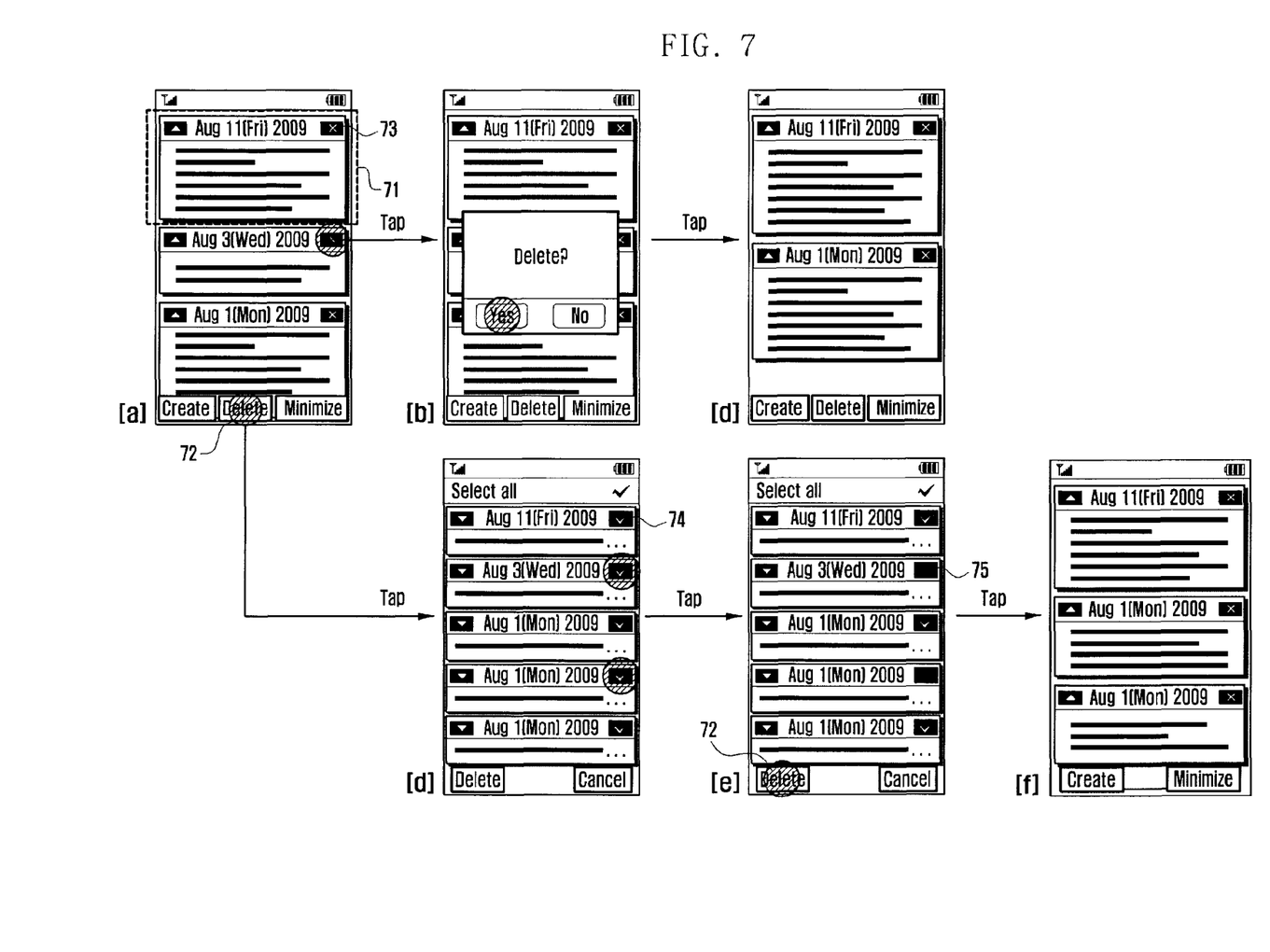
FIG. 7 is a diagram illustrating a text information list presentation process of the text information display method according to the third embodiment of the present invention.

FIG. 7 is a diagram illustrating a text information list presentation process of the text information display method according to the third embodiment of the present invention.

Part [a] of FIG. 7 shows a screen displaying the text information list composed of three text information items 71 ordered from the top to the bottom. The text information items are ordered by creation date from the top to the bottom of the list. Each text information item is formed in a shape of the rectangular bar, and has the creation date and partial content of the corresponding text information. The text information list is provided with a common delete key 72 labeled 'Delete' at the bottom center of the screen, a common shrink key labeled 'Minimize' at the bottom right corner, and a new text information creation key labeled 'Create' at the bottom right corner.

In the state where the text information list is displayed, the control unit 160 monitors by means of the touch sensing unit 131 to detect an input and, in an input is detected, determines whether the input is made to the individual delete key of one of the text information items (603). If the input is made to the individual delete key of a text information item, the control unit 160 controls such that the corresponding text information item is removed from the text information list. In the embodiment, if the individual text information item delete key is input, the control unit controls such that a delete confirmation popup window is displayed and, if the user confirms, deletes the corresponding text information item from the text information list.

In case that the text information items are ordered from the top to the bottom of the screen, when the text information item is deleted, the next order text information items move upward as much as the space made by the text information item deleted. The text information items are presented in the text information display region and, when one of the text information items is deleted, a low order text information item appears from the bottom of the screen.

Parts [b] and [c] of FIG. 7 shows the text information list with the delete confirmation popup window presented when a tap gesture is made to the individual delete key of a specific text information item, and the text information list presented when the deletion is confirmed by means of the popup window. As shown in part [b] of FIG. 7, a deletion confirmation popup window is presented on the text information list such that, when the user selects the option 'Yes' on the deletion confirmation popup window, the corresponding text information item is removed from the text information list as shown in part [c] of FIG. 7. In part [c] of FIG. 7, the text information list is reordered such that the third highest order text information item moves upward to fill the space of the second highest order text information item removed.

If the input is not made to the individual delete key of any text information item, the control unit 160 determines whether the input is made to the common delete key (605). If the input is made to the common delete key, the control unit 160 controls to change the individual deletion keys for selection keys such that user can select the text information items individually (606). In the embodiment, each selection key is provided with a mark of '✓'. In case that the text information items are presented without individual delete keys, the control unit 160 can control such that the text information items are presented with individual selection keys at step 606.

If an input is made to the common delete key in the state where all the text information items are presented with their whole contents respectively, the control unit 160 controls such that the text information items shrink to show their partial contents. When the input is made to the common delete key, the control unit 160 can change the common delete key in position on the screen.

Part [d] of FIG. 7 shows the text information list presented when a tap gesture is made to the common delete key 72 on the screen of part [a] of FIG. 7. In part [d] of FIG. 7, all of the text information items 71 shrink, and the individual delete keys are changed into the individual selection keys 71. As the text information items 71 shrink, the fourth to sixth highest order text information items, which are not shown in the screen image of part [a] of FIG. 7, appears in the screen image of part [d] of FIG. 7. In part [d] of FIG. 7, the common delete key 72 labeled 'Delete' is moved from the bottom center to the bottom left corner.

Next, the control unit 160 monitors by means of the touch sensing unit 131 to detect whether at least one of the text information items is selected (607). The control unit 160 can recognize the touches made to the individual selection keys and the text information items by means of the touch sensing unit 131. Accordingly, the control unit 170 can regard only the touches made to the selection keys as the selection command or both the touches made to the selection keys and the text information items themselves.

If at least one text information item is selected, the control unit 160 controls such that the selected text information item is presented with an effect indicating its selection (608). In the embodiment, the individual selection key of the selected text information item is discriminated from the selection key of the normal text information item in shape.

Part [e] of FIG. 7 shows the text information list presented when a tap gesture is made to the individual selection keys of the second and fourth highest order text information items on the screen of part [d] of FIG. 7. As shown in part [e] of FIG. 7, the individual selection keys of the second and fourth highest order text information items are changed in shape of black check mark 75 of '✓' as opposed to the white check mark 74 of the non-selected text information item.

Next, the control unit 160 monitors by means of the touch sensing unit 131 to detect whether an input is made to the common deletion key (609). If an input is made to the common deletion key, the control unit 160 controls such that at least one selected text information item is removed from the text information list (610). At this time, the control unit 160 controls such that the individual selection keys are changed into the individual delete keys. Further, the control unit 160 controls such that the remained text information items are ordered in a direction with their whole contents after the deletion of the selected text information items.

Part [f] of FIG. 7 shows the text information list presented when an input gesture is made to the common delete key 72 labeled 'Delete' in the screen of part [e] of FIG. 7. In part [f] of FIG. 7, the second and fourth highest order text information items shown in part [e] of FIG. 7 are removed, and the first, third, and fifth highest order text information items are presented in the expanded mode while filling the space of the second and fourth highest order text information items removed.

In the third embodiment of the present invention, the user can delete the text information items selective from the text information list. Particularly when deleting multiple text information items at a time, the text information items are presented in shrunk mode such that the user can navigate the text information items easily, thereby improving user convenience.

Figure 8:
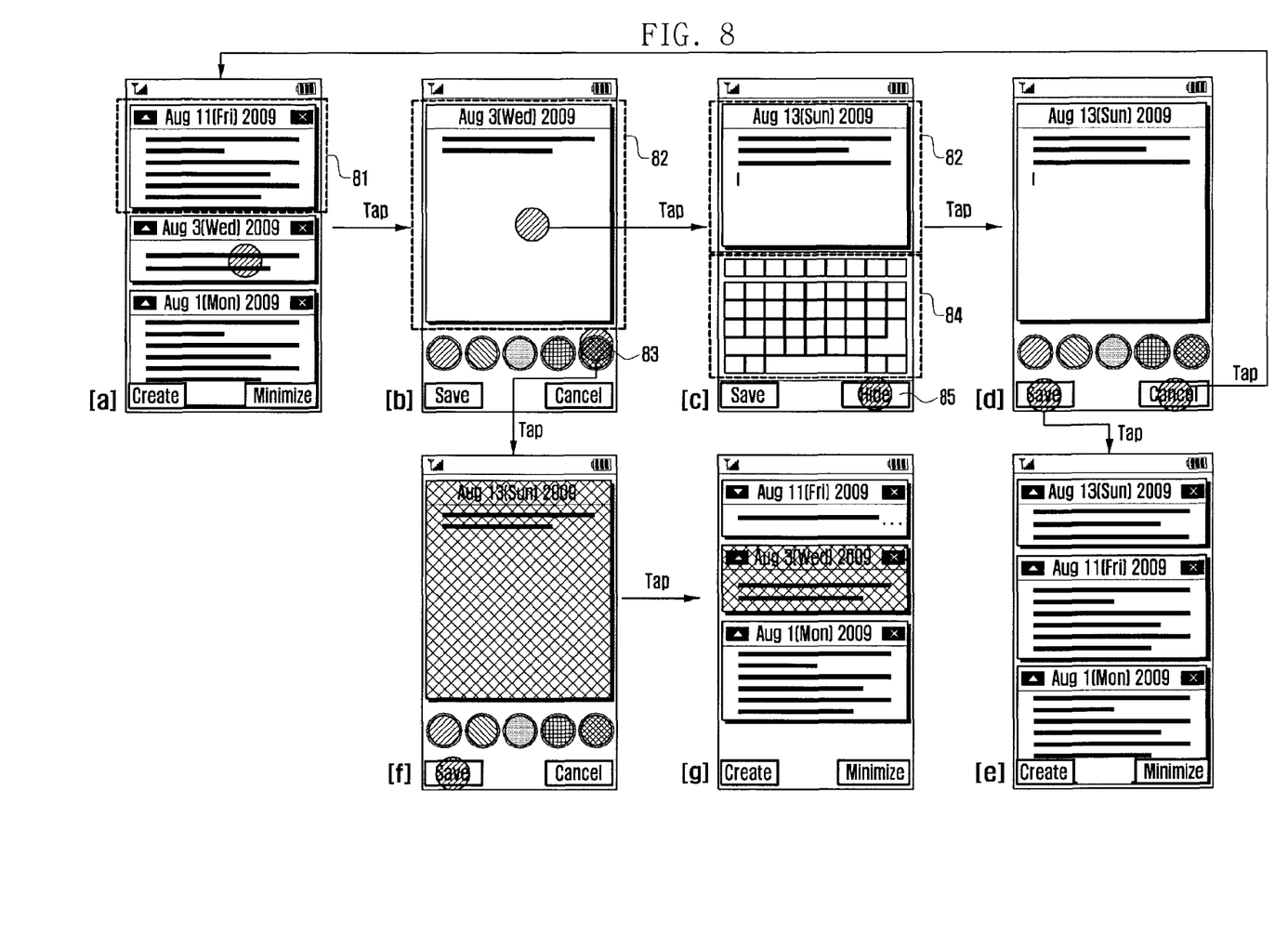
FIG. 8 is a diagram illustrating a text information edit process of the text information display method according to the embodiment of the present invention.

Moreover, if the user makes a touch to one of the text information items of the text information list, the control unit 160 controls such that a text information edit screen is displayed. Also, if the user makes a touch on the text information edit screen, the control unit 160 controls such that a virtual keyboard is presented for the user to input text.

Furthermore, the text information edit screen can be provided with a plurality of background color items for the user to select a background color. If the user makes a touch to one of the background color selection items, the control unit 160 controls such that the background color of the text information edit screen changed in response to the touch input.

FIG. 8 is a diagram illustrating a text information edit process of the text information display method according to an embodiment of the present invention.

Part [a] of FIG. 8 shows a screen displaying the text information list composed of three text information items 81 ordered from the top to the bottom. Each text information item 81 is presented with the whole content of the corresponding text information. Each text information item is also presented with the information on the creation data of the corresponding text information.

Part [b] of FIG. 8 shows the text information edit screen presented when a tap gesture is made to the second highest order text information item of the text information list shown in part [a] of FIG. 8. As shown in part [b] of FIG. 8, the text information edit screen is provided with an editing window 82 and a plurality of background color items 83. The editing window 82 presents the whole content of the text information represented by the second text information item. In part [b] of FIG. 8, the text information edit screen is provided with a save key for saving the edit and a cancel key for canceling the edit.

Part [c] of FIG. 8 shows the text information edit screen presented when a tap gesture is made to the editing window 82 in part [b] of FIG. 8. As compared to the text information edit screen of part [b] of FIG. 8, the text information edit screen of part [c] of FIG. 8 has the editing window 82 shrunk in size and a virtual keyboard 84 below the shrunk editing window 82. The cancel key shown in part [b] of FIG. 8 is changed into a hide key 85 for hiding the virtual keyboard.

Part [d] of FIG. 8 shows the text information edit screen presented when a tap gesture is made to the hide key 85 in part [c] of FIG. 8. As compared to part [c] of FIG. 8, the text information edit screen of part [d] of FIG. 8 is provided with the background color items and the cancel key rather than the virtual keyboard 84 and the hide key 85. If a tap gesture is made to the cancel key of part [d] of FIG. 8, the text information edit screen is switched for the text information list screen as shown in part [a] of FIG. 8 without applying the edit done by the user.

Part [e] of FIG. 8 shows the text information list screen presented when a tap gesture is made to the save key in part [d] of FIG. 8. If the save key is input, the controls unit 160 saves the text information as edited and controls such that the second highest order text information item of which content is edited by the user is presented as the first highest order text information item in the text information list.

Part [f] of FIG. 8 shows the text information edit screen presented when one of the background color items is selected in part [b] of FIG. 8. In part [f] of FIG. 8, the edit window 82 is provided with the background color corresponding to the selected background color item. Part [g] of FIG. 8 shows the text information list screen presented when a tap gesture is made to the save key in part [f] of FIG. 8. As shown in part [g] of FIG. 8, the second highest order text information item is presented with the selected background dolor.

As described above, the text information display method and apparatus of the present invention allows the user to check the whole contents of the information items provided in the form of a list on a single screen without changing the text information list screen for the individual text information presentation screen. Also, the text information display method and apparatus of the present invention is advantageous for the user to check the contents of a plurality of text information items on a single screen, resulting in improvement of user convenience.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for displaying text information, comprising:
   displaying, on a display screen, a list including a first text information item, a second text information item, and a first common input component for performing a first operation on multiple text information items of the list,
   displaying on each information item of the list dedicated input components selectable to execute a same function as the first operation, such that while the first common input component is displayed, a first dedicated input component is displayed disposed on the first text information item selectable to perform the first operation only on the first text information item, and a second dedicated input component is displayed disposed on the second text information item selectable to perform the first operation only on the second text information item;
   responsive to activation of the first dedicated input component, executing the first operation only on the first text information item;
   responsive to a first activation of the first common input component, removing the first dedicated input component to display a third dedicated input component, and removing the second dedicated input to display a fourth dedicated input component;
   detecting inputs to the third dedicated input component and the fourth dedicated input component indicating that the first text information item and the second text information item are included in a group of selected text information items; and
   responsive to a second activation of the first common input component, performing the first operation on the group of selected text information items including the first text information item and the second text information item.

2. The method of claim 1, wherein the first common input component includes a key and activating the first common input component includes pressing the key, the method further comprising:
   responsive to the first activation of the first common input component, expanding the first text information item while removing the second text information item from display when space for displaying both the expanded first text information item and the second text information item is insufficient.

3. The method of claim 1, wherein the first dedicated input component and the third dedicated input component are different types of input components.

4. The method of claim 3, wherein the first dedicated input component includes a key and the third dedicated input component includes a checkbox.

5. The method of claim 1, wherein the first text information item comprises an omission symbol that indicates that a portion of a body of the first text information item is hidden from view.

6. The method of claim 1, wherein the first operation is performed on each text information item in the group responsive to the second activation of the first common input component.

7. The method of claim 6, wherein:
   the third dedicated input component and the fourth dedicated input component include checkboxes for specifying whether the first text information item and the second text information item, respectively, should be included in the group; and
   performing the first operation on each text information item in the group includes deleting all text information items in the group.

8. The method of claim 1, wherein displaying the list includes superimposing the first common input component over the second text information item.

9. The method of claim 1, further comprising:
   displaying a create button selectable to generate a new information item for display in the displayed list, and a minimize button selectable to minimize all information items of the displayed list; and
   responsive to detecting the activation of the first common input component, removing the create button and shifting the first common input component to a position from where the create button is removed, and removing the minimize button to display a cancellation button selectable to cancel the first operation.

10. The method of claim 9, further comprising:
    responsive to detecting selection of a particular information item of the list, expanding the selected particular information item and removing the list from display, and displaying a row of color buttons, each color button selectable to alter a background color of the particular information item,
    wherein, after one of the color buttons is selected, the list is redisplayed with the particular information item having a background color corresponding to the selected color button.

11. An electronic device comprising a display screen and a processor configured to:
    display, on the display screen, a list including a first text information item, a second text information item, and a first common input component for performing a first operation on multiple text information items,
    display on each information item of the list dedicated input components selectable to execute a same function as the first operation, such that while the first common input component is displayed, a first dedicated input component is displayed disposed on the first text information item selectable to perform the first operation only on the first text information item, and a second dedicated input component is displayed disposed on the second text information item selectable to perform the first operation only on the second text information item;

responsive to activation of the first dedicated input component, execute the first operation only on the first text information item;

responsive to a first activation of the first common input component, remove the first dedicated input component and displayed a third dedicated input component, and remove the second dedicated input to display a fourth dedicated input component;

detect inputs to the third dedicated input component and the fourth dedicated input component indicating that the first text information item and the second text information item are included in a group of selected text information items; and responsive to a second activation of the first common input component, performing the first operation on a group of selected text information items, the group including the first text information item and the second text information item.

12. The electronic device of claim 11, wherein the first common input component includes a key and activating the first common input component includes pressing the key, wherein the processor is further configured to:

responsive to the first activation of the first common input component, expand the first text information item while removing the second text information item from display when space for displaying both the expanded first text information item and the second text information item is insufficient.

13. The electronic device of claim 11, wherein the first dedicated input component and the third dedicated input component are different types of input components.

14. The electronic device of claim 13, wherein the first dedicated input component includes a key and the third dedicated input component includes a checkbox.

15. The electronic device of claim 11, wherein the first text information item comprises an omission symbol that indicates that a portion of a body of the first text information item is hidden from view.

16. The electronic device of claim 11, wherein the first operation is performed on each text information item in the group responsive to the second activation of the first common input component.

17. The electronic device of claim 16, wherein:

the third dedicated input component and the fourth dedicated input component include checkboxes for specifying whether the first text information item and the second text information item, respectively, should be included in the group; and performing the first operation on each text information item in the group includes deleting all text information items in the group.

18. The electronic device of claim 11, wherein the processor is further configured to:

display on the display screen a create button selectable to generate a new information item for display in the displayed list, and a minimize button selectable to minimize all information items of the displayed list; and responsive to detecting the activation of the first common input component, remove the create button and shifting the first common input component to a position where the create button is removed, and remove the minimize button to display a cancellation button selectable to cancel the first operation.

19. The electronic device of claim 18, wherein the processor is further configured to:

responsive to detecting selection of a particular information item of the list, expand the selected particular information item and removing the list from display, and display on the display screen a row of color buttons, each color button selectable to alter a background color of the particular information item, wherein, after one of the color buttons is selected, the list is redisplayed with the particular information item having a background color corresponding to the selected color button.

* * * * *